(12) United States Patent
Haupt et al.

(10) Patent No.: US 11,700,317 B2
(45) Date of Patent: Jul. 11, 2023

(54) ERROR RECOVERY IN DIGITAL COMMUNICATIONS

(71) Applicant: DISH Network L.L.C., Englewood, CO (US)

(72) Inventors: Bob Haupt, Englewood, CO (US); Kevin Johnston, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/730,984

(22) Filed: Dec. 30, 2019

(65) Prior Publication Data
US 2020/0213410 A1    Jul. 2, 2020

Related U.S. Application Data

(60) Provisional application No. 62/786,505, filed on Dec. 30, 2018.

(51) Int. Cl.
| | |
|---|---|
| *H04L 67/568* | (2022.01) |
| *G06F 16/28* | (2019.01) |
| *H04L 67/1097* | (2022.01) |
| *H04L 67/02* | (2022.01) |
| *G06F 11/14* | (2006.01) |

(52) U.S. Cl.
CPC ........ *H04L 67/568* (2022.05); *G06F 11/1479* (2013.01); *G06F 16/284* (2019.01); *H04L 67/02* (2013.01); *H04L 67/1097* (2013.01)

(58) Field of Classification Search
CPC ... H04L 67/1097; H04L 1/0041; H04L 67/02; H04L 67/34; H04L 67/2842; H04L 67/568; G05B 19/4184; G06F 16/9535; G06F 16/248; G06F 16/285; G06F 16/22; G06F 11/1479; G06F 16/28; G06F 16/284; G06F 16/3331; G06F 16/43

See application file for complete search history.

(56) References Cited

U.S. PATENT DOCUMENTS

| | | | |
|---|---|---|---|
| 10,607,086 B1* | 3/2020 | Grady | G06V 40/161 |
| 2003/0177265 A1* | 9/2003 | Page | G06F 16/9562 709/245 |
| 2006/0007731 A1* | 1/2006 | Dumitru | G06F 16/2457 365/185.01 |
| 2011/0258158 A1* | 10/2011 | Resende, Jr. | G06F 16/24532 707/E17.044 |
| 2012/0114313 A1* | 5/2012 | Phillips | H04N 9/7921 386/E5.041 |

(Continued)

*Primary Examiner* — Mohamed A. Wasel
*Assistant Examiner* — Zonghua Du
(74) *Attorney, Agent, or Firm* — KW Law, LLP

(57) ABSTRACT

Electronic communications between a client device and a server device are improved by providing a middleware component that incorporates electronic data read and/or written to a database in a hybrid data structure. The hybrid structure is further designed to allow for "NULL" or other pre-defined data values when one or more data fields are unavailable or erroneous. The client device, in turn, can be configured to check for the pre-defined data values in certain fields and to gracefully process such values. The hybrid structure with pre-defined error values therefore provides for very efficient data transmittal and processing, while retaining the ability to handle errors or other unusual situations relating to the data.

9 Claims, 2 Drawing Sheets

(56) References Cited

U.S. PATENT DOCUMENTS

| | | | |
|---|---|---|---|
| 2012/0331134 A1* | 12/2012 | Lynn | G06F 16/2458 709/224 |
| 2014/0032981 A1* | 1/2014 | Ahmed | G06F 16/252 714/49 |
| 2014/0195514 A1* | 7/2014 | Stein | G06F 16/256 707/722 |
| 2014/0258445 A1* | 9/2014 | McCoy | H04L 67/565 709/217 |
| 2014/0337467 A1* | 11/2014 | Pech | H04L 67/02 709/217 |
| 2015/0039587 A1* | 2/2015 | Liu | G06F 16/24524 707/718 |
| 2016/0119683 A1* | 4/2016 | Katz | H04N 21/26208 725/88 |
| 2016/0315816 A1* | 10/2016 | Fang | H04W 4/70 |
| 2016/0344832 A1* | 11/2016 | Kukreja | H04L 67/02 |
| 2017/0091680 A1* | 3/2017 | Rosenthal | G06Q 10/0633 |
| 2019/0156241 A1* | 5/2019 | Hughes | G06F 16/25 |
| 2019/0197169 A1* | 6/2019 | Brewinski | G06F 16/951 |
| 2019/0325114 A1* | 10/2019 | Maughan | G06F 21/604 |
| 2020/0159731 A1* | 5/2020 | Gino | G06F 16/2471 |

\* cited by examiner

ERROR RECOVERY IN DIGITAL COMMUNICATIONS

PRIORITY CLAIM

This application claims priority to U.S. Provisional Patent Application Ser. No. 62/786,505 filed on Dec. 30, 2018, which is incorporated herein by reference.

TECHNICAL FIELD

The following discussion generally relates to digital communications, such as communications over the Internet. More particularly, the following discussion relates to systems, devices and automated processes to improve error recovery in digital communications.

BACKGROUND

Data communications permeate every aspect of modern life. The Internet, for example, is now widely used for entertainment, communications and countless other applications. Web-based services, in particular, have become increasingly popular in recent years. To provide just one example of such a service, many users now receive television or similar media programming as a data stream delivered from a server via the Internet. Typically, the user manipulates a browser or similar application to navigate to a server, to select content, and to control streaming content as it is delivered to the user's phone, tablet, computer and/or other device.

One challenge that often arises involves reading and writing data to web-based databases. In the context of a video streaming system, for example, a subscriber may have certain preferences, settings and other user-specific data that are retained in an online database for subsequent retrieval across one or more different client devices. Reading, updating and deleting subscriber-specific information can be cumbersome in practice, and most conventional attempts to streamline the process have been met with limited success. In particular, many attempts to combine multiple reads and/or writes to the databases have been difficult to implement on the client side, especially with regard to error recovery.

It is therefore desirable to create devices, systems and processes to improve access to online databases within the networked computing environment. Other desirable features and characteristics will become apparent from the subsequent detailed description and the appended claims, taken in conjunction with the accompanying drawings and this background section.

BRIEF DESCRIPTION

Various embodiments relate to different automated processes, computing systems, devices and other aspects of a data processing system that provides improved data communications between client and server devices, particularly in processing database queries and updates. Rather than relying upon conventional REST or SOAP-type interactions to facilitate reads and writes to the database, a hybrid structure is created that allows for multiple data fields to be combined into a single entity that can be passed across the network. A middleware application residing on the server system, for example, can facilitate multiple interactions with the database on behalf of the client system and parse the combined result into the hybrid structure for transmission across the network. The client device, in turn, can process the hybrid structure to extract and process needed data. Further, error handling can be processed more conveniently by setting corrupt or unavailable data fields to a predefined (e.g., "NULL") value that can be recognized and processed by the client device, thereby preventing crashes and other issues that were inherent in previous attempts to combine database activity. These general concepts may be modified or expanded in any number of different ways, as described more fully below.

In some embodiments, an automated process is executed by a computer system comprising a processor and an interface to a network. The automated process suitably comprises: receiving, from a client device via the network, a message comprising a data structure that encompasses a plurality of data fields; for each of the data fields in the data structure, placing a query to a database to obtain a series of responses each comprising information related to one of the plurality of data fields; combining the information from each of the responses into a hybrid data structure; and transmitting the hybrid data structure comprising the information from each of the responses to the client device as a single message via the network. In some implementations, the data structure is a JSON data structure or the like processed by a middleware component of the computer system. Further embodiments may identify an error in one of the responses received from the database by placing a NULL or other predetermined value in data field of the hybrid data structure corresponding to the error.

Another embodiment relates to an automated process executed by a client device having a processor and an interface to a network. The automated process suitably comprises: transmitting a query for information from a database to a server system via the network; responsively receiving from the server system a hybrid data structure comprising a plurality of data fields, wherein each of the data fields in the hybrid data structure comprises information separately obtained from the database by a middleware component operating at the server system through a sequence of queries each requesting information relating to one of the data fields; and processing the hybrid data structure by the client device to use the information from each of the data fields in the hybrid data structure.

Still other embodiments provide a data processing system comprising a processor, a non-transitory storage and an interface to a network. The data processing system suitably comprises: a database management system that manages a database of information stored on the non-transitory storage; a web server that receives requests for database information from client devices via the network interface; and a middleware component that responds to the requests received from the client devices by placing a plurality of queries to the database management system, wherein each of the queries corresponds to a single item of information in the database, and wherein the middleware component is further configured to combine the items of information received from the plurality of queries into a hybrid data structure for transmission to the client device as a single transmission via the network.

Various additional embodiments relate to other automated processes executed by client and/or server devices. The processes may be implemented using programming instructions that are stored in memory or other storage, and that are executed by a processor or similar computing hardware.

Still other embodiments relate to client and/or server devices each having a processor, memory or other digital storage, and an interface to a digital network. Software, firmware or other programming instructions to perform various functions are stored in the digital storage for execution by the processor.

These and other examples are described in increasing detail below.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

According to various embodiments, electronic communications between a client and a server are improved by providing a middleware component that incorporates electronic data read and/or written to a database in a hybrid data structure. The hybrid structure is further designed to allow for "NULL" or other pre-defined data values when one or more data fields are unavailable or erroneous. The client device, in turn, can be configured to check for the pre-defined data values in certain fields and to gracefully process such values. The hybrid structure with pre-defined error values therefore provides for very efficient data transmittal and processing, while retaining the ability to handle errors or other unusual situations relating to the data.

Figure 1:
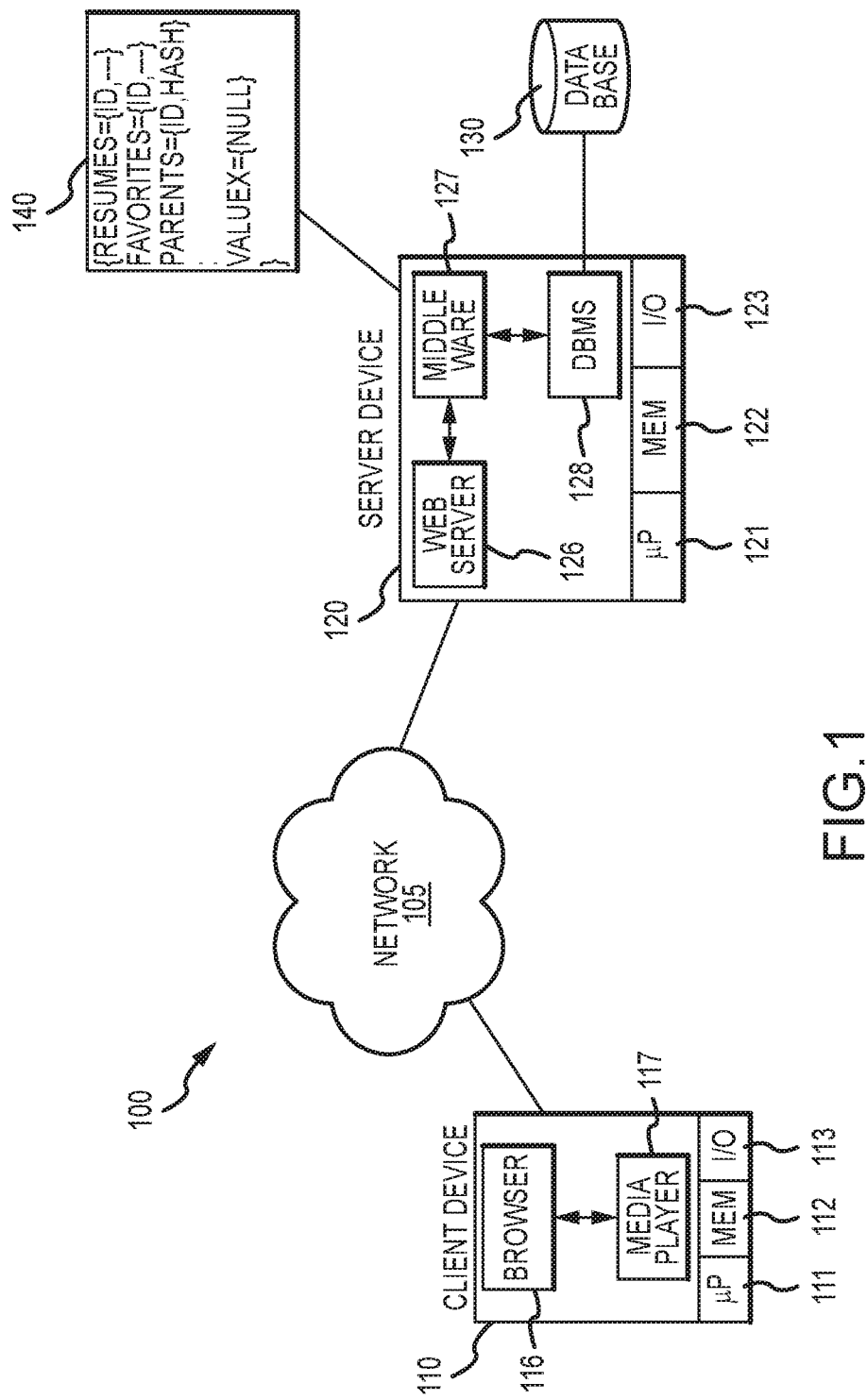
FIG. 1 illustrates an example of a system to improve communications between a client device and a server device via a wide area network.

FIG. 1 shows an example system 100 that could be used to process database related communications between a mobile phone, tablet, media player, personal computer, video game player, set top box or other client device 110 and a server device 120 via the Internet or another wide area network 105. In a video player application, for example, a client device no associated with a subscriber or other user suitably obtains video content from a video server 120 via the Internet or another network 105. Typically, the subscriber will have a relatively persistent set of personalized configuration settings that will be retained in a database 130 for retrieval at the outset of a video streaming session. Such information might include, for example, favorites or other preferences, resume points where previous viewing of one or more programs ended, parental controls and/or other information as desired. Typically, a media player application 117 executing on the client device 110 will request the user information from a server 120 that has access to the user's previously-stored information in a database 130.

Traditionally, the client device 110 would separately obtain each user setting by transmitting a series of HTTP/REST type "GET" statements across network 105 to server 120. The server system 120 would receive each GET statement, place a query to the database 130 for the requested data, and forward the information received from the database 130 to client device 110 as a series of response messages as appropriate. Writing new user information typically involved a conventional "PUT" or "POST" statement sent to server system 120, and deletion of a database entry would be handled with a "DELETE" instruction as desired. The challenge with this setup, however, is that each data field would typically require its own uniform resource identifier (URI), along with its own handling code for separate GET, PUT, POST, DELETE and other instructions. This can result in inefficient and often duplicate programming in a relatively large code base that can be challenging to troubleshoot and maintain. Moreover, there is no convenient mechanism for "cross-cutting" queries or updates that would allow simultaneous processing of multiple data fields.

Further embodiments were able to combine the various relational state transfer (REST), SOAP or similar constructs into a common JSON (JavaScript on Network) or similar structure that could be passed between the server device 120 and client device no as appropriate. In this scenario, queries and other interactions with the database 130 are handled by a middleware component 127 or the like that obtains and assembles data into an appropriate message format that can be collectively transmitted to the client device no to incorporate most, if not all, of the required data. The client device no similarly incorporates programming that updates the shared structure as needed and that passes the updated structure back to the middleware component 127 to update the database 130.

The hybrid structure may be implemented using, for example, JavaScript Object Notation (JSON) or the like, with one or more data fields populated with arrays or lists of data as appropriate. Resume points for partially-viewed video programs, for example, may be stored in an array or other list that includes identifiers of the partially-viewed program as well as an indicator of the previous stop time within the program (e.g., an MPEG presentation time stamp (PTS) or other time reference to the latest point of the program that was previously viewed). The various REST (or similar) resources are therefore abstracted as a virtual JSON (or similar) structure. Queries from the client device 110 to the server system 120 could therefore take the form of a nested array (e.g., [[userid, [resumes], [favorites], parent], id]) or the like. The server system 120 could respond with a JSON document or the like that incorporates all of the requested data.

Challenges can still arise, however, if one or more data sources are unavailable, if no data exists for one or more queried fields, or if other issues arise. Previously, if even one requested field was unavailable, the entire request would fail because the hybrid structure could not be completed. Some implementations could attempt to replace missing data with an error message, but even this would fail for clients that are statically typed. If a client device 110 is expecting a field to contain a numeric value, for example, a textual error message in that field could be difficult to process.

Further embodiments therefore allow one or more data fields of the hybrid structure to be populated with pre-determined values (e.g., "NULL" values) when good data is otherwise unavailable for any reason. That is, the middleware component 127 or the like inserts a "NULL" value into the hybrid structure 140 when good data is unavailable, thereby allowing the rest of the structure to be populated and delivered as normal. The client device 110 is further programmed to check for "NULL" values in the received structure, and to gracefully address the missing data when a "NULL" value is found. Although true NULL values may be useful in many practical applications, equivalent embodiments may substitute any other pre-determined values that are agreed upon between the client and server prior to delivery of actual data. That is, other actual mathematical or logical values could be equivalently used in place of a true "NULL" value, as desired.

Programming to process database information (including null handling routines) may be incorporated into a media player application 117, a web browser 116, a separate middleware component, or any other component of client device 110 as desired. With reference now to FIG. 1, and example data communications system 100 suitably includes a client device 110 that interoperates with a server system 120 via the Internet or another network 105. Both the client device 110 and the server system 120 are hardware devices that are implemented using computing circuitry.

Client device 110, for example, typically includes at least one processor 111, memory 112 and input/output interfaces 113 to electronically interface with data network 105, to accept inputs from a user and to provide suitable visual and/or audio output to the user, as desired. Generally speaking, processor 111 executes various software and/or firmware components that reside in memory 112 or other non-transitory digital storage of client device 110 to implement the various functions and features described herein. FIG. 1, for example, shows a browser application 116 and a media player application 117 that cooperate within client device 110 to select, receive and play back digital media content to the user, although other embodiments may use other modules to provide other features, as desired. Client device may be variously implemented as a mobile telephone, tablet computer, personal computer, video game player, media player and/or other hardware device, as appropriate.

Server system 120 similarly includes one or more processors 121, memory 122 and input/output circuitry to transmit and receive electronic communications via network 105 and to interact with a database 130. Server system 120 may be implemented with any sort of computing hardware, including any number of physical processors. In various embodiments, server system 130 is implemented using cloud-type computing systems wherein the hardware is abstracted to the programmer and/or user, but is nevertheless physically present in a remote data processing center or the like. Database 130 is typically formatted in any manner, and stored on a hard disk, solid state device and/or other non-transitory physical data storage device, as desired.

In the embodiment illustrated in FIG. 1, server system 120 includes a web server application 126 and a database management system (DBMS) 128, as well as a middleware component 127 that manages interactions between the two. The various components are illustrated on the same hardware system 120 for convenience, but equivalent embodiments will implement the different components 126, 127, 128 using separate computing hardware interacting with each other over a bus or network, as appropriate.

Middleware component 127, for example, could be implemented within the context of a web server, database front end and/or the like, if desired. In practice, middleware component 127 includes software or firmware instructions to create and manage the hybrid data structures 140 described herein. Various embodiments will include logic to recognize errors or other issues in data received from database 130 or the like, for example, and to populate the hybrid structure 140 that is transmitted to the client device 110 with NULL (or similar) values. Various embodiments may also format the hybrid structure 140 with an additional text field, if desired, that can contain error messages or the like.

Figure 2:
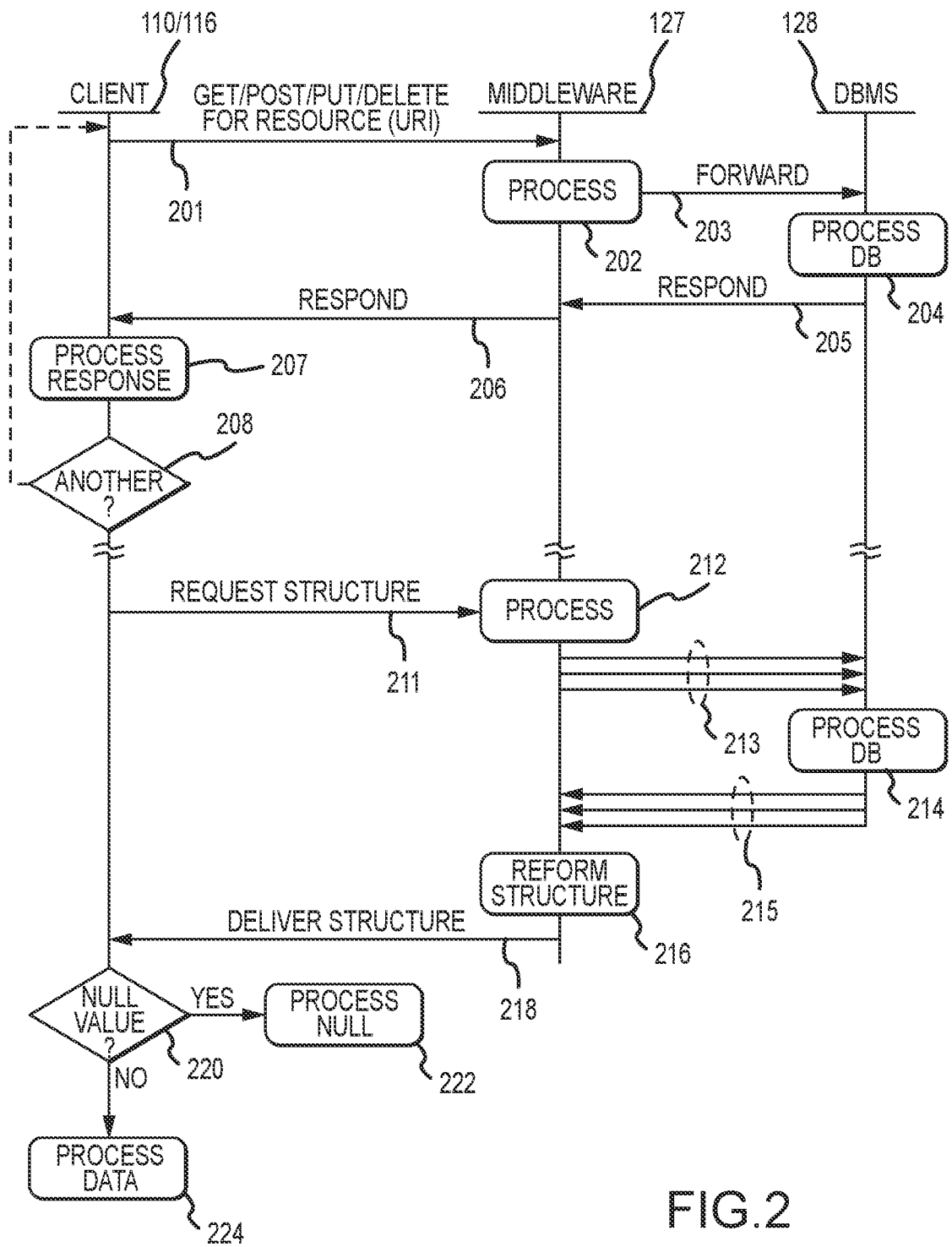
FIG. 2 is a diagram showing various example processes to improve communications between client and server devices via a wide area network.

FIG. 2 is a diagram of example processes 200 to transmit electronic data between a database 130 and a client device 110. Process 200 includes various functions performed by a client device 110/111, a middleware component 127 executing on a server computer 120, and/or a database management system 128 executing on the same server 120 or a different server 120, as desired. The various functions and messages shown in FIG. 2 may be supplemented or modified as desired in any number of alternate but equivalent embodiments.

With reference now to FIG. 2, a more traditional data transfer process could allow client 110 to interact with database 130 through conventional REST, SOAP or similar structures. In the illustrated example, client 110 (using web browser 116 and/or other resources) places conventional GET/PUT/POST/DELETE or other instructions 201 to URIs or similar resources associated with server system 120 via network 105. The instructions are typically received at the web server 126 and provided to middleware 127 for handling.

Middleware 127 suitably processes the received instruction (function 202) to interact with the DBMS 128 (function 203) to place queries, updates or the like. Interaction with DBMS 128 may be via structured query language (SQL) or similar constructs, as appropriate. DBMS 128 suitably reads and/or writes data from the database 130, as instructed (function 204) and updates the middleware component 127 (function 205). Middleware component 127 receives the update 205 from the DBMS 128 and formats a suitable response that is delivered to the client device 110 via web service 126, as appropriate. The client device 110 is able to receive the response 206 and process the received data (function 207). This entire process then repeats for each other data field/URI (function 208) until the client device 110 has received all of the needed data.

A more efficient process, however, involves the hybrid structure 140, particularly as augmented with "NULL" value error processing. Rather than transmitting a series of separate messages to URIs associated with different data fields, the client device no instead places a single request 211 for the hybrid structure 140. The request 211 is received by the web server 126 and forwarded to middleware component 127 for handling (function 212). As shown in FIG. 2, middleware component 126 provides multiple instructions 213 to the DBMS 128. The multiple instructions 213 may be provided in series and/or parallel, or according to any temporal scheme. DBMS 128 responsively interacts with database 130 (function 214) for each of the multiple instructions 213, and provides multiple responses 215 as appropriate to deliver all of the requested data. Middleware 127 processes the responses 215 to format the hybrid structure 140, which is then transmitted to the client device 110 via web server 126 (function 218).

The general process 211-218 could be used to read information from the database 130, and/or to update the information stored in database 130 in a much more efficient manner in comparison to the process shown in functions 202-208. In various embodiments, the client device 110 updates the database by formatting the data structure 140 that is transmitted to the server system 120. Middleware 127 suitably receives the data structure 140 and updates the database 130 as appropriate by submitting the appropriate WRITE or UPDATE instructions to the database 130 based upon the contents of data structure 140.

As noted above, the data structure 140 may be configured so that if any data fields/URIs are unavailable, the value of that data field is replaced with predetermined (e.g., NULL) values. Such values may be detected by the client device 110 (function 220) using, for example, IF-THEN type structures or the like. If null values are identified within data structure 140, then the client device can appropriately process the missing content (function 222). The missing data may be ignored, for example, or replaced with any default values, as desired. In various embodiments, the data structure 140 may include one or more text fields that contain appropriate error messages (e.g., "Data not available") that can be further processed, e.g., by reporting the error to the user or taking other actions as desired. Other data found within the data structure 140 may be processed normally (function 224).

Various embodiments have therefore been described to improve electronic data communications between a client device and a server system via the Internet or another network. As described herein, multiple REST or similar messages can be combined into a hybrid JSON or similar structure by a middleware component or the like executing on a server system 120. As noted above, the hybrid structure may be further augmented with predetermined (e.g., NULL) values for any missing or otherwise problematic data. The structure may be formulated by a middleware component operating within the server system, and processed as desired by the client device. By providing a hybrid messaging structure, the number of messages transmitted across the network can be substantially reduced, thereby providing for more efficient data processing. Moreover, by incorporating error handling into the hybrid structure, any issues in data communications can be more effectively and efficiently addressed by the client device, as desired. In particular, the absence of one or more data fields will no longer affect the delivery of other good data, thereby improving the user experience.

The foregoing discussion often refers to a video streaming system that uses a database to store user configuration data, including parental controls, preferences and playback stop points. Other embodiments, however, could equivalently process any sort of data for any number of different applications. To provide just a few examples, equivalent embodiments could relate to local or remote storage digital video recorders, video on demand services, internet television, video gaming and/or any number of other applications.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executed by a computer system comprising a processor and an interface to a network, wherein the automated process comprises:
   receiving, from a remotely-located client device via the network, a message comprising a data structure that references a plurality of data fields in a database;
   for each of the plurality of data fields in the data structure, the computer system placing a query to the database to obtain a response to the query from the database, wherein each of the responses from the database comprises information obtained from one of the plurality of data fields in the database received in response to one of the queries placed by the computer system;
   checking, by the computer system, each of the responses received from the database to identify one or more errors;
   combining, by the computer system, the information from each of the responses from the database into a single hybrid data structure comprising data for each of the plurality of data fields referenced in the data structure received from the client device, and wherein if the one or more errors are identified, the combining comprises placing a predetermined value in one or more data fields of the single hybrid data structure corresponding to the one or more errors identified, wherein the single hybrid data structure is a JavaScript Object Notation (JSON) data structure processed by a middleware component of the computer system; and
   transmitting the single hybrid data structure comprising the information from each of the responses from the database to the client device, wherein the single hybrid data structure is transmitted from the middleware component of the computer system to the client device as a single hypertext transfer protocol (HTTP) POST message via the network, and wherein the single hybrid data structure comprises one or more data fields describing user configuration data associated with a media streaming application executed by the client device, and wherein the user configuration data comprises an array of information describing resume points in each of a plurality of previously-viewed media programs, wherein each resume point in the array structure is described by a program identifier and a time identifier representing a presentation time stamp of the resume point during the previously-viewed media program.

2. The automated process of claim 1 wherein the middleware component inserts the predetermined value into each data field of the single hybrid data structure that corresponds to the one or more errors identified.

3. The automated process of claim 2 wherein the predetermined value is a NULL value.

4. A data processing system comprising a processor, a non-transitory storage and an interface to a network, wherein the data processing system comprises:
   a database management system that manages a database of information stored on the non-transitory storage;
   a web server that receives requests for database information from a client device via the network interface; and
   a middleware component that responds to the requests received from the client device by placing, for each of the requests, a plurality of queries to the database management system, wherein each of the plurality of queries placed by the middleware component corresponds to a single item of information in the database referenced by the requests received from the client device, and wherein the middleware component is further configured to combine all of the single items of information received from the plurality of queries to the database into a single hybrid data structure that is a JavaScript Object Notation (JSON) data structure for transmission to the client device as a single hypertext transfer protocol (HTTP) POST message via the network, wherein the middleware component is further configured to indicate an error in one or more of the single items of information received from the plurality of queries into the single hybrid data structure using a predetermined value in a data field of the single hybrid data structure that corresponds to the error, and wherein the single hybrid data structure comprises one or more data fields describing user configuration data associated with a media streaming application executed by the client device, and wherein the user configuration data comprises an array of information describing resume points in a plurality of different previously-viewed media programs, wherein each resume point in the array structure is described by a program identifier and a time identifier representing a presentation time stamp of the resume point during the previously-viewed media program.

5. The data processing system of claim 4 wherein the predetermined value is a NULL value.

6. The data processing system of claim 4 wherein the user configuration data further comprises favorite media programs and parental controls.

7. A data processing system comprising a processor, a non-transitory storage and an interface to a network, wherein the data processing system comprises:
   a database management system that manages a database of information stored on the non-transitory storage;
   a web server that receives requests for database information from a remotely-located client device via the network interface; and
   a middleware component that responds to the requests received from the remotely- located client device by placing, for each of the requests, a plurality of local queries to the database management system, wherein each of the plurality of local queries placed by the middleware component corresponds to a single item of information in the database referenced by the requests received from the remotely-located client device, and wherein the middleware component is further configured to combine all of the single items of information received from the plurality of local queries to the database into a single hybrid data structure that is a JavaScript Object Notation (JSON) data structure for transmission to the client device as a single hypertext transfer protocol (HTTP) POST message via the network, wherein the middleware component is further configured to indicate an error in one or more of the single items of information received from the plurality of local queries into the single hybrid data structure using a predetermined value in a data field of the single hybrid data structure that corresponds to the error, and wherein the single hybrid data structure comprises data fields describing user configuration data associated with a media streaming application executed by the remotely-located client device, and wherein the user configuration data comprises an array of information describing resume points in each of a plurality of different previously-viewed media programs, and wherein each resume point in the array structure is described by a program identifier and a time identifier representing a presentation time stamp of the resume point during the previously-viewed media program.

8. The data processing system of claim 7 wherein the user configuration data described in the single hybrid data structure further comprises favorite media programs and parental controls.

9. The data processing system of claim 8 wherein the predetermined value is a NULL value.

* * * * *